Figure 1:
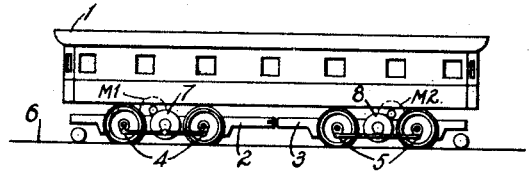

R. E. HELLMUND.
CONTROL SYSTEM.
APPLICATION FILED JAN. 5, 1916.

1,349,376.

Patented Aug. 10, 1920.
4 SHEETS—SHEET 1.

WITNESSES:
R. J. Fitzgerald.
W. C. McCoy.

INVENTOR
Rudolf E. Hellmund.
BY
Wesley G. Carr
ATTORNEY

R. E. HELLMUND.
CONTROL SYSTEM.
APPLICATION FILED JAN. 5, 1916.
1,349,376.
Patented Aug. 10, 1920.
4 SHEETS—SHEET 2.
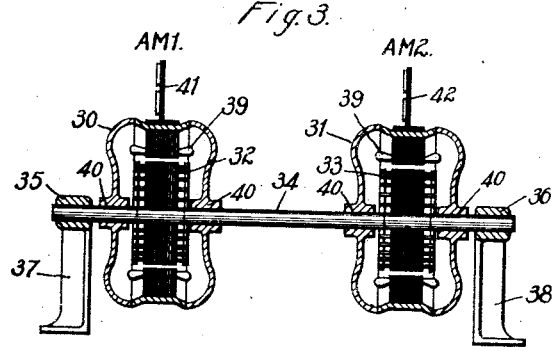
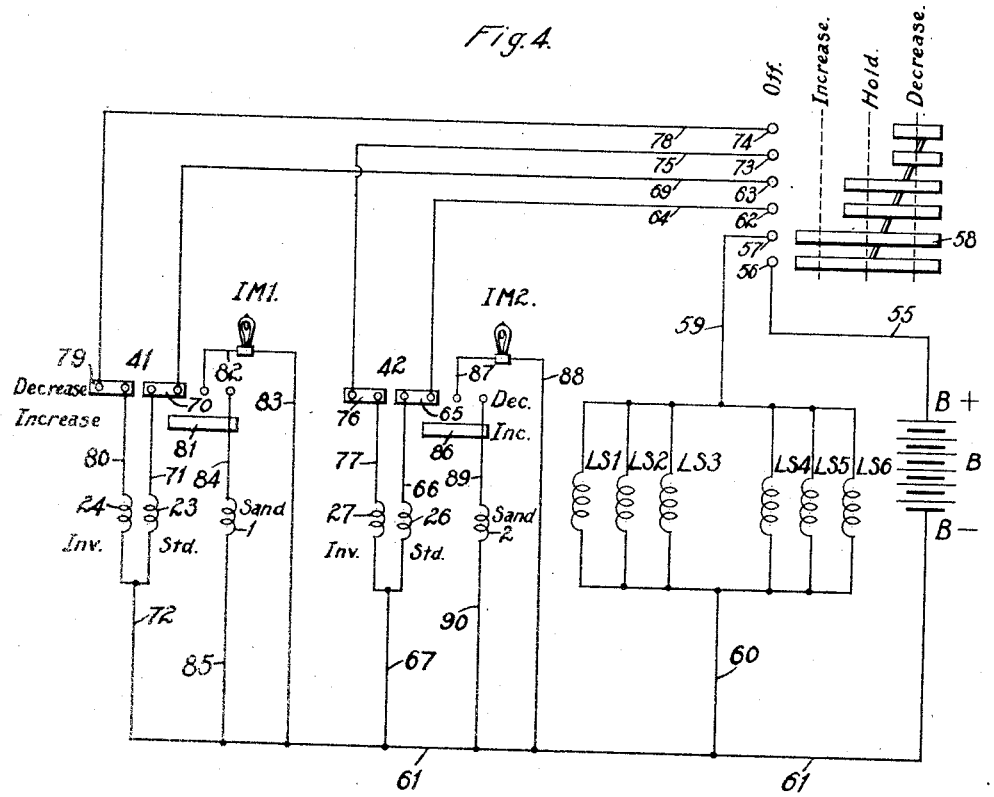

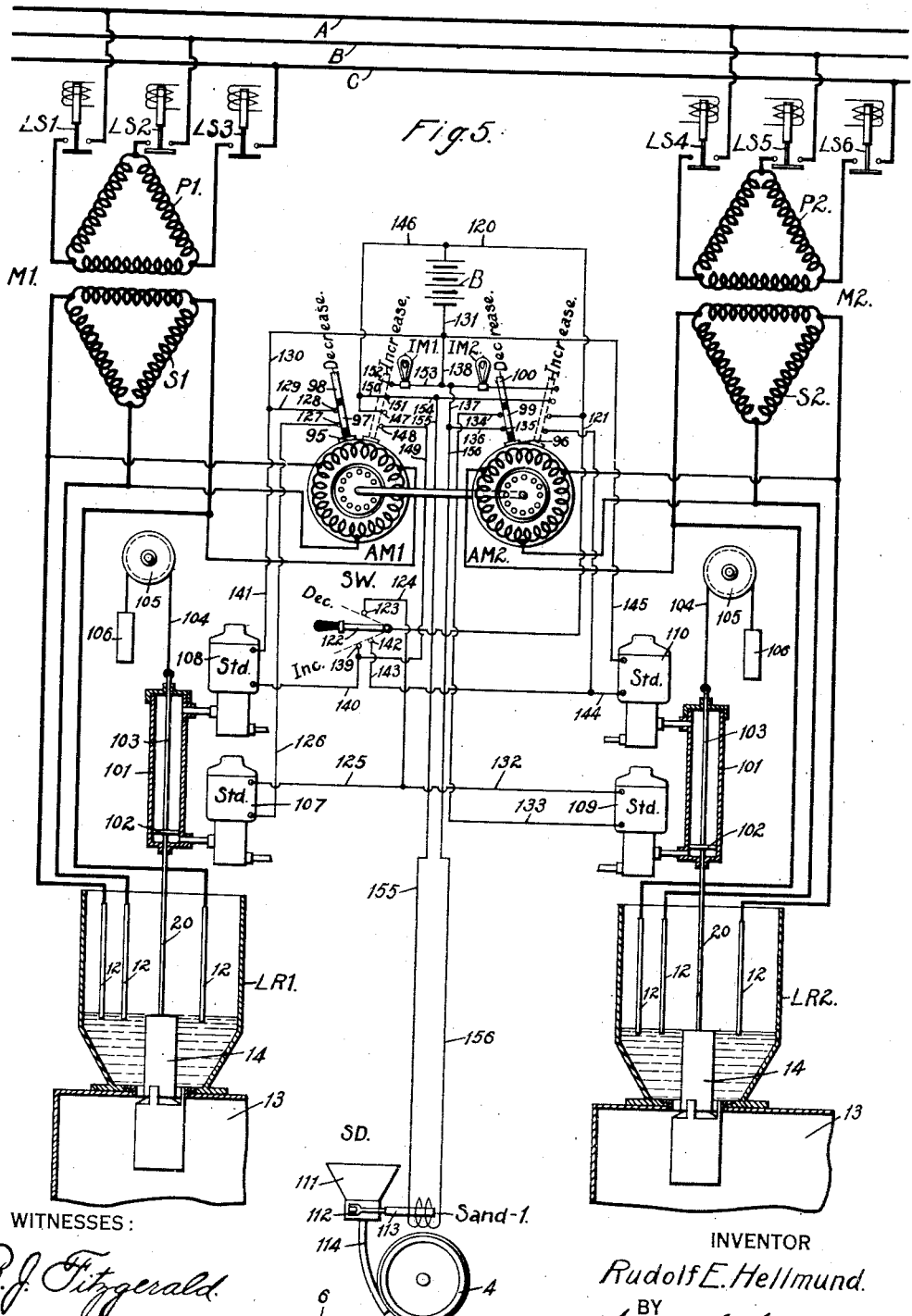

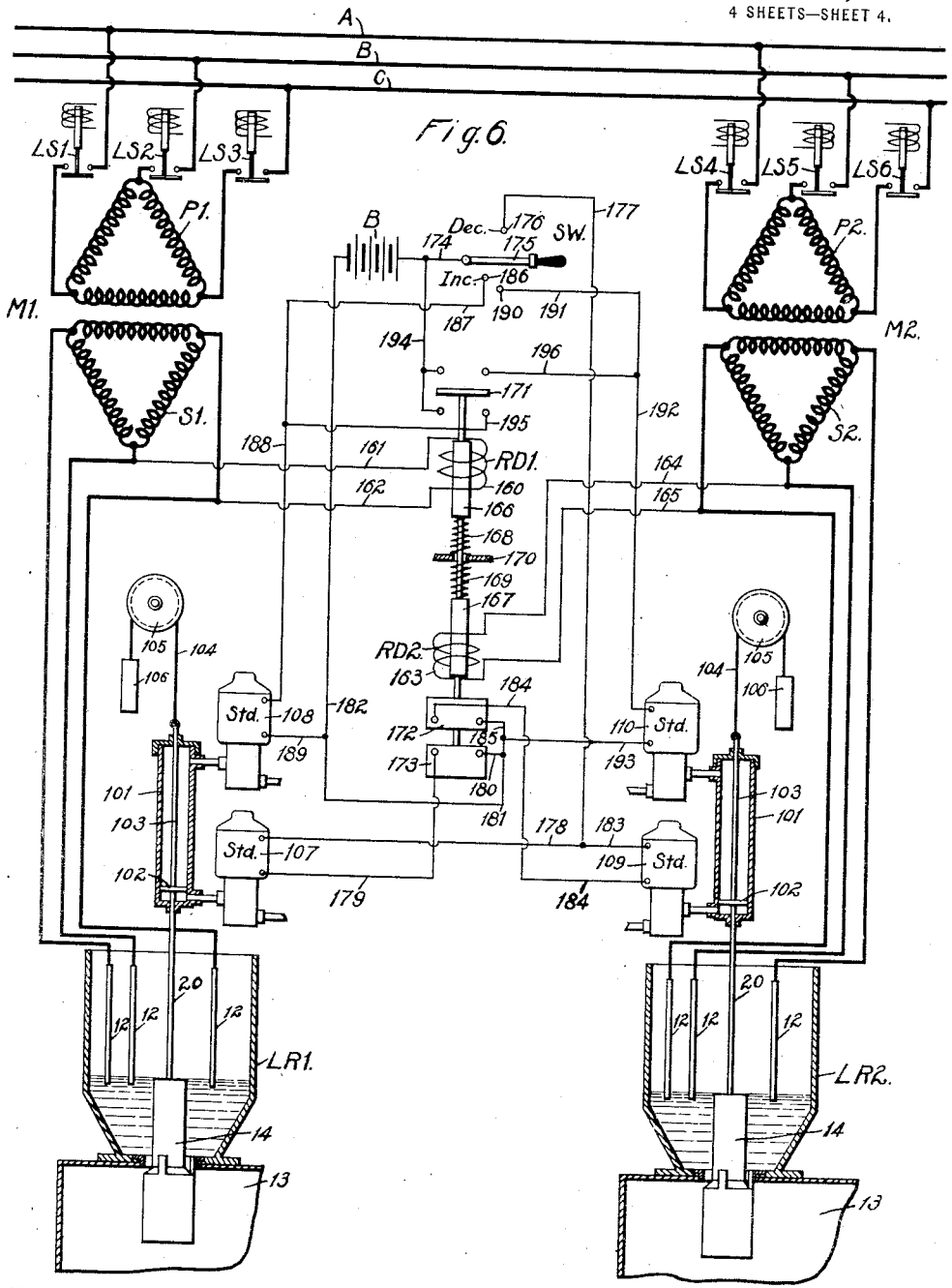

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,349,376.

Specification of Letters Patent.   Patented Aug. 10, 1920.

Application filed January 5, 1916. Serial No. 70,437.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Control Systems, of which the following is a specification.

My invention relates to electrically-propelled vehicles and to systems of control therefor and especially to vehicles that are driven by a plurality of induction motors.

One object of my invention is to provide, in connection with a system of the above-indicated character, means which shall be relatively simple and inexpensive in construction and effective and reliable in operation for automatically performing predetermined functions to restore normal conditions when any set of driving wheels "slips", that is, rapidly rotates without gripping the rails.

More specifically stated, it is the object of my invention to provide, in a system of the class under consideration, means whereby, under predetermined slippage conditions of any motor, the rotor-circuit resistance thereof may be automatically increased, thus tending to maintain normal speed conditions.

In the prior art, when the acceleration of a plurality of driving induction motors has been either partially or wholly dependent upon the action of a limit switch that is actuated in accordance with the primary current of the induction motor or motors, difficulties have been experienced whenever the vehicle wheels that are associated with any of the motors have started to slip. Under such circumstances, the primary current of the slipping motor decreases to a relatively low value, whereby the limit switch remains in its lower position to effect the gradual short-circuiting of the corresponding rotor or secondary-circuit resistance, in accordance with the usual function of the limit switch; whereas, in order to eliminate the slippage, the rotor-circuit resistance of the corresponding induction motor should be increased until the speed of the motor has decreased to its normal value, in accordance with familiar principles.

According to my present invention, I provide electrical relay means that are electrically connected with the rotors of the several driving induction motors and are adapted to counter-balance each other under normal and substantially equal-speed conditions of the motors but which are adapted to produce an unbalanced effect under predetermined unequal rotor-speed conditions, such as occur upon the slippage of one motor and the corresponding wheels, and I associate with the relay means certain switching means for automatically increasing the rotor-circuit resistance of the slipping motor or performing other restorative functions, as hereinafter more fully set forth.

Figure 2:
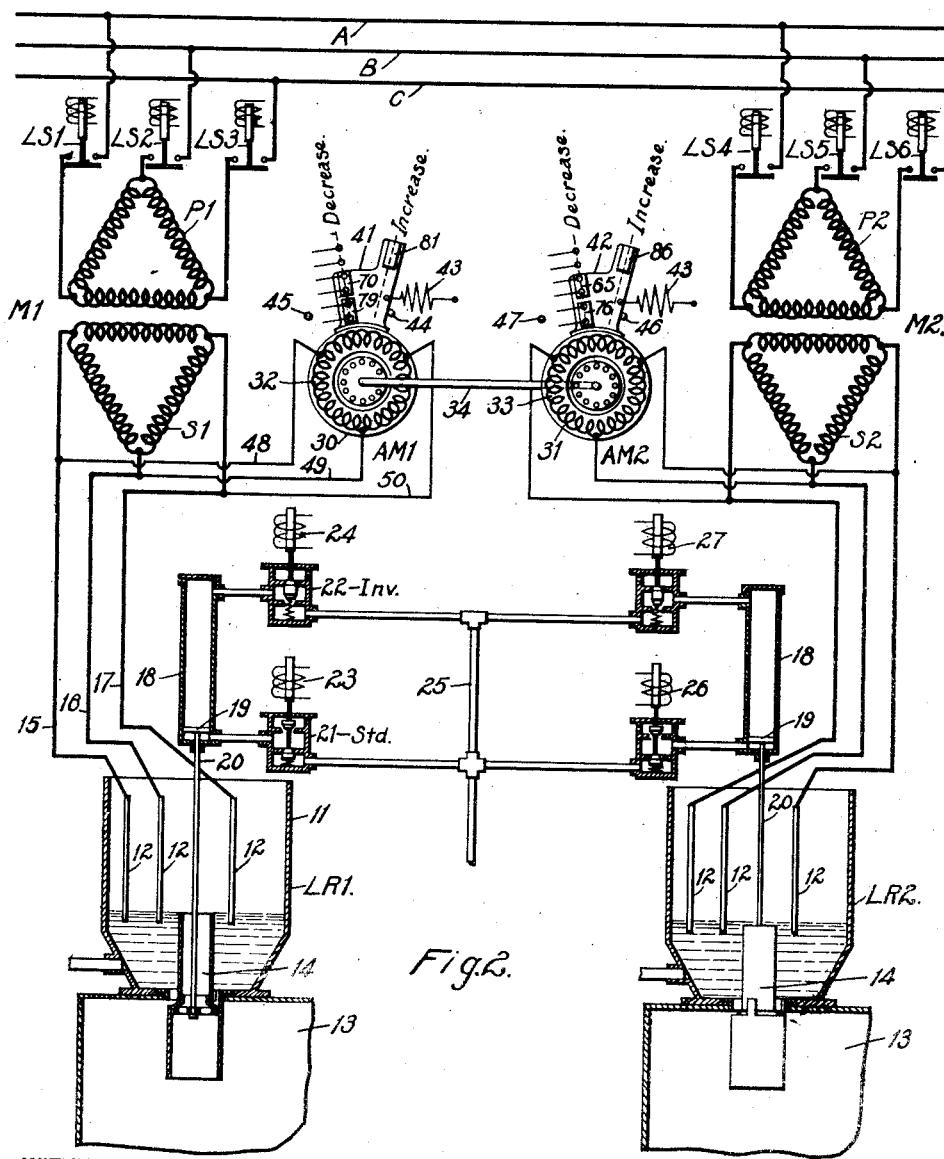

In the accompanying drawings, Figure 1 is a diagrammatic view of an electric locomotive unit embodying a plurality of driving motors to which my invention may be applied; Fig. 2 is a diagrammatic view of the main circuits of a system of control embodying my invention; Fig. 3 is a diagrammatic view, showing the details of construction of a portion of the apparatus that is shown in Fig. 2; Fig. 4 is a diagrammatic view of an auxiliary governing system for manipulating the circuits of Fig. 2 under predetermined conditions; and Fig. 5 and Fig. 6 are diagrammatic views, that correspond to Fig. 2, of various modifications of the parts of my invention.

Referring to Fig. 1, the structure shown comprises a locomotive cab 1 which is suitably supported upon a plurality of articulated trucks 2 and 3 of suitable design and which respectively embody a plurality of driving wheels 4 and 5, that are adapted to run upon rails 6, in accordance with usual practice. A plurality of driving induction motors M1 and M2 are provided and may be associated with the wheels of the various trucks in any suitable manner, as by driving mechanisms 7 and 8 of a familiar type.

Referring now to Fig. 2, the system shown comprises a plurality of suitable three-phase supply-circuit conductors A, B and C; the driving induction motors M1 and M2 that may respectively comprise delta-connected primary windings P1 and P2 and coöperating delta-connected secondary or rotor windings S1 and S2; a plurality of suitable variable accelerating resistors LR1 and LR2 for the rotor windings S1 and S2 respectively; a plurality of main-circuit switches LS1, LS2 and LS3 for connecting the primary winding P1 to the supply-circuit conductors; a plurality of similar switches LS4, LS5 and LS6 for performing a similar function with respect to the primary winding P2; and a plurality of auxiliary induction motors AM1 and AM2 that are associated with the main rotor windings S1 and S2 in a manner and for a purpose to be described.

The variable resistors LR1 and LR2 are here shown as comprising resistors of the familiar liquid-rheostat type and severally embody suitable electrolyte-containing tanks or chambers 11, within which are disposed a plurality of suitable immersible plates or electrodes 12, as is customary; and lower compartments 13 from which the electrolyte may be pumped into the tanks 11 and to which the electrolyte may be returned in accordance with the action of suitable regulating and discharge valves 14 that are more fully described in a co-pending application of A. J. Hall, Serial No. 873,919, filed Nov. 25, 1914, and assigned to the Westinghouse Electric & Manufacturing Company. Inasmuch as the particular type of rheostat and the structural details thereof are immaterial to my present invention, I do not deem it necessary to describe the same any further.

The electrodes or plates 12 of the rheostat LR1 are respectively connected to the terminals of the secondary winding S1 by conductors 15, 16 and 17, and the electrodes of the other rheostat LR2 are similarly connected to the secondary winding S2.

The operating mechanism for each of the valves 14, whereby electrolyte is admitted to the tank 11 to gradually decrease the rotor-circuit resistance or is discharged from the tank 11 to the compartment 13 to increase such resistance, comprises a suitable operating cylinder 18 within which travels a piston member 19 that is secured by a rod 20 to the movable member of the valve 14; a valve 21 for admitting fluid pressure beneath the piston 19 to aid in effecting the admission of electrolyte to the tank 11; a second valve 22 for normally admitting fluid pressure to the cylinder 18 above the piston 19; a plurality of actuating coils 23 and 24 for the valves 21 and 22, respectively; and a suitable fluid-pressure piping system 25 for conveying fluid under pressure to the respective valves under predetermined conditions.

The valve 21 is normally closed and the coil 23 is deënergized to prevent the access of fluid pressure to the cylinder 18 and to directly connect the portion of the cylinder 18 that lies below the piston 19 with the atmosphere. Such a valve will hereinafter be referred to as "standard" valve. The other valve 22 is normally open and the coil 24 is deënergized, to admit fluid pressure to the cylinder 18 above the piston 19, and only when the coil 24 is energized is fluid pressure exhausted from the cylinder 18 through the valve 22 to the atmosphere. The valve just described will hereinafter be designated as an "inverted" valve. The actuating coils of the valves 21 and 22 respectively correspond to the actuating coils 26 and 27 of the operating mechanism of the other rheostat LR2.

The electrical relay means that here comprise the auxiliary induction motors AM1 and AM2 are more clearly structurally illustrated in Fig. 3. The auxiliary induction motors respectively comprise stators 30 and 31, and squirrel-cage rotors 32 and 33 that are rigidly mounted upon a suitable shaft 34 the ends of which are carried in suitable bearings 35 and 36 that are respectively supported by pedestals or brackets 37 and 38.

The stators 30 and 31 are severally provided with suitable phase windings 39 and with bearings 40 on the shaft 34, whereby the stators may rotatively move within predetermined limits, as about to be described, under certain torque conditions. The stators 30 and 31 are respectively provided with switching devices 41 and 42, here shown as being of the face-plate type, that may be biased to positions marked "Decrease" by means of suitable springs 43, and, in these positions the devices respectively rest against stops or pins 44 and 46 that are suitably associated with any stationary member, such as projections of the bearing brackets 37 and 38, if desired. The switching devices 41 and 42 are also severally adapted to occupy second positions marked "Increase" when the stators 30 and 31 are actuated as far as second stops or pins 45 and 47, respectively, under predetermined operating conditions to be described later.

The terminals of the stator winding of the auxiliary induction motor AM1 are connected to the respective terminals of the secondary winding S1 by conductors 48, 49 and 50, and the stator winding of the other auxiliary induction motor AM2 is similarly associated with the other main secondary winding S2.

Referring to Fig. 4, the auxiliary governing system shown comprises the actuating coils of the several switches LS1 to LS6, inclusive; the actuating coils 23 to 27, inclusive, of the liquid rheostats LR1 and LR2; the contact members of the switching devices 41 and 42; and, in addition, a plurality of indicating means IM1 and IM2, that may comprise lamps, bells or the like, and are preferably disposed near a train operator so that he may readily notice the indications without turning away from his regular work; a plurality of actuating coils marked "Sand-1" and "Sand-2" for actuating rail-sanding devices of the type to be described in connection with Fig. 5; a suitable master controller MC having four positions respectively marked "Off," "Increase," "Hold" and "Decrease;" and a suitable source of energy, such as a battery B, for energizing the various actuating coils and indicating means in accordance with the position of the master controller MC and the switching devices 41 and 42.

Assuming that it is desired to effect operation of the system that is shown in Fig. 2, the master controller MC may be moved to its final operative position "Decrease," whereupon a circuit is established from the positive terminal of the battery B, through conductor 55, control fingers 56 and 57, which are bridged by contact segment 58 of the master controller, conductor 59, the parallel-connected actuating coils of the switches LS1 to LS6, inclusive, and conductors 60 and 61 to the negative battery terminal, thereby connecting the primary windings of the driving motors M1 and M2 to the supply-circuit conductors.

Further circuits are established from the contact segment 58 of the master controller through control fingers 62 and 63. A circuit is completed from control finger 62, through conductor 64, contact member 65 of the switching device 42 in its normal position "Decrease," conductor 66, the actuating coil 26 of the standard magnet valve of the rheostat LR2, and conductor 67 to the negative conductor 61. Another circuit is completed from the control finger 63, through conductor 69, contact member 70 of the switching device 41, conductor 71, the actuating coil 23 of the standard magnet valve 21 of the rheostat LR1 and conductor 72 to the negative conductor 61. The contact segment 58 also engages control fingers 73 and 74 at this time, whereby one circuit is completed through conductor 75, contact member 76 of the switching device 42, conductor 77, the actuating coil 27 of the inverted valve of the rheostat LR2 and conductor 67 to the negative conductor 61. A further circuit is completed from control finger 74, through conductor 78, contact member 79 of the switching device 41, conductor 80, actuating coil 24 of the inverted valve 22 of the rheostat LR1 and conductor 72 to the negative conductor 61. The operating mechanisms of the liquid rheostats LR1 and LR2 will thus be actuated upwardly to gradually admit electrolyte to the tanks 11 and thereby gradually reduce the secondary resistance of the respective motors as their speed increases, in accordance with familiar practice. To arrest the movement of the operating mechanism at any time, it is merely necessary to actuate the master controller to its intermediate position "Hold," whereby the contact segment 58 is disengaged from control fingers 73 and 74 and the actuating coils 27 and 24 of the two inverted valves are deënergized, so that balanced pressure conditions obtain on opposite sides of the pistons 19. In order to effect the discharge of electrolyte from the tanks 11 and thus increase the rotor-circuit resistances, the master controller may be actuated to its position "Increase," whereby all of the actuating coils of the liquid rheostats LR1 and LR2 are deënergized, and the pistons 19 are returned to the positions shown in the drawing.

It will be understood that, in lieu of the manually-operated governing system just described, the familiar automatic system wherein the actuating coils 24 and 27 of the inverted valves are energized and deënergized in accordance with the position of a limit switch that has its actuating coil connected in the primary circuit of the main induction motors, may be employed, if desired.

Assuming that the wheels 4 that are associated with the driving motor M1 "slip" so that the primary current in the winding P1 is relatively low, while the speed of the rotor winding S1 is relatively high and its frequency low, the rotor 32 of the auxiliary induction motor AM1 will tend to rotate at a lower speed that corresponds to the decreased speed of the rotating field in the stator 30. However, such decreased speed will be prevented, at least partially, by the normal action of the mechanically associated rotor 33 of the other auxiliary induction motor tending to drive the rotor 32 over-synchronously, so that a reactive or generator torque is exerted upon the stator 30, whereby the stator rotatively moves in a counter-clockwise direction until the switching device 41 strikes the stop 45 and the switching device occupies its position "Increase."

As a result, an auxiliary circuit (see Fig. 4) is completed from the conductor 69, through contact member 81 of the switching device 41, conductor 82, indicating means IM1 and conductor 83 to the negative conductor 61. Simultaneously, the contact member 81 is connected to conductor 84, whence circuit is completed through the actuating coils "Sand-1" and conductor 85 to the negative conductor 61.

It will be observed that the movement of the switching device 41 first deënergizes the actuating coils 23 and 24 of the liquid rheostat LR1, whereby the electrolyte is discharged through the valve 14 to the compartment 13, or, in other words, the resistance in the circuit of the rotor winding SR1 is increased until the speed of the rotor S1 has decreased to normal value, when the generator torque of the auxiliary induction motor AM1 disappears and the normal motor torque, assisted by the spring 43, returns the switching device 41 to the position shown in the drawing. The movement of the switching device 41 to its position "Increase", likewise energizes the indicating means IM1 and the actuating coil of the rail-sanding device, whereby the train-operator may be notified whenever any of the wheels are slipping and whereby the rails may be sanded, as more fully set forth in connection with Fig. 5. It will be understood that any one of the three functions performed by the switching device 41 may be omitted, if desired; for example, the automatic increase of the rotor-circuit resistance may be omitted, and, upon the energization of the indicating means IM1, the train operator may suitably manipulate a master controller to manually effect the desired increase of rotor-circuit resistance and thus eliminate the slippage of the motor M1.

It will be understood that, in case the motor M2 and the corresponding wheels are "slipping", the auxiliary rotor 33 and the associated switching device 42 are automatically actuated to their position "Increase", whereby the circuits of the actuating coils 26 and 27 of the liquid rheostats are opened, while a new circuit is completed from conductor 64, through contact member 86 of the switching device 42, conductor 87, indicating means IM2 and conductor 88 to the negative conductor 61. A further circuit is completed from contact member 86, through conductor 89, the actuating coil "Sand-2" and conductor 90 to the negative conductor 61.

Reference may now be had to Fig. 5, wherein the system shown comprises the supply-circuit conductors A, B and C; the main induction motors M1 and M2; the auxiliary induction motors AM1 and AM2; the liquid rheostats LR1 and LR2; the indicating means IM1 and IM2; the battery B and the switches LS1 to LS6, inclusive, as hereinbefore described; and, in addition, a sanding device SD and a starting switch SW.

The auxiliary induction motors AM1 and AM2 are respectively provided with switches 95 and 96 that are movable with the respective stators 30 and 31, within predetermined limits, and are provided with pairs of contact members 97 and 98 and 99 and 100, respectively, for purposes to be described.

The operating mechanism for each of the liquid rheostats LR1 and LR2 is somewhat different from that previously described and comprises a suitable operating cylinder 101 within which is disposed a piston member 102 that is associated with the rod 20 of the valve 14, while a second rod 103 is secured to the opposite side of the piston 102 and is of a sufficient length to extend through one end of the cylinder 101 when the piston 102 is located at the other end thereof. The rod 103 is connected to a cord or cable 104 that passes over a pulley 105 and has a suitable counterbalancing weight 106 attached to its outer end. A pair of standard magnet valves 107 and 108 are associated with the respective ends of the cylinder 101 for admitting fluid pressure to the one or the other side of the piston 102 in accordance with the energization of the respective valve magnets. The other liquid rheostat LR2 is provided with a similar pair of operating valve magnets 109 and 110.

The sanding device SD may comprise a suitable hopper 111, an appropriate valve member 112 that is associated with the core member 113 of the actuating coil "Sand-1" and a suitable pipe or tube 114 for conveying the sand to the rails 6 in front of the wheels 4.

Assuming that it is desired to effect acceleration of the driving motors, the switches LS1 to LS6, inclusive, may be closed in any suitable manner and the switch SW may be actuated to its upper position marked "Dec.", standing for decrease, whereby a circuit is established from one terminal of the battery B through conductors 120 and 121, the blade 122 of the switch SW, stationary contact member 123, conductors 124 and 125, actuating coil 107 of the operating mechanism of the liquid rheostat LR1, conductor 126, control fingers 127 and 128, which are bridged by contact member 97 of the switching device 95 in its normal position "Decrease", and conductors 129, 130 and 131 to the negative battery terminal. A parallel circuit is completed from conductor 125 through conductor 132, the actuating coil 109 of the operating mechanism of the rheostat LR2, conductor 133, control fingers 134 and 135, which are bridged by contact member 99 of the auxiliary switching device 96, and conductors 136, 137 and 138 to the negative conductor 131. In this way, the operating mechanisms of the liquid rheostats are actuated to admit electrolyte to the tanks 11 and gradually decrease the rotor-circuit resistances of the driving induction motors.

To effect the discharge of the electrolyte from the tanks 11, the switch SW may be actuated to its other position marked "Inc." standing for increase, whereupon one circuit is established from the blade 122 of the switch SW, through stationary contact member 139, conductor 140, actuating coil 108 of the liquid rheostat LR1, and conductor 141 to the negative conductor 130. A simultaneous circuit is completed from the switch blade 122 through stationary contact member 142, conductors 143 and 144, actuating coil 110 of the liquid rheostat LR2 and conductor 145 to the negative conductor 131. Thus, fluid pressure is admitted above the pistons 102, the valves 14 are opened and the electrolyte is discharged from the tanks 11.

Assuming that the motor M1 and the corresponding wheels "slip" while the switch SW occupies its position Dec., the unbalanced generator torque of the auxiliary induction motors will cause the switching device 95 to occupy its dotted-line position marked "Increase," in accordance with the principles already explained in connection with Fig. 2. Consequently, a circuit is completed from one terminal of the battery B through conductor 146, control fingers 147 and 148, which are bridged by the contact member 97 of the switching device 95, conductors 149 and 140 and thence through the actuating coil 108 of the liquid rheostat LR1. The other actuating coil 107 is simultaneously deënergized by reason of the disengagement of the contact member 97 from the control fingers 127 and 128. Thus, fluid pressure is admitted to the cylinder 101 above the piston 102 and is exhausted from below the piston through the valve that is associated with the magnet 107, and the resistance of the circuit of the rotor winding S1 is gradually increased until the speed of the slipping motor is reduced to normal, when the normal motor torque, or such torque, assisted by the spring 43, if employed, will return the switching device 95 to the normal solid-line position.

The movement of the switching device 95 to its position "Increase" establishes another circuit from conductor 146 through conductor 150, control fingers 151 and 152, which are bridged by contact member 98 of the switching device 95, the indicating means IM1 and conductor 153 to the negative conductor 138, thereby notifying the train operator of the slipping conditions of the motor M1.

Still another circuit is completed at this time from the control finger 151 of the switching device 95, through conductors 154 and 155, the actuating coil "Sand-1" of the sanding device SD and conductor 156 to the negative conductor 138.

It will be understood that, under slippage conditions of the other main motor M2, the switching device 96 is automatically actuated to its dotted-line position Inc., whereupon the slippage conditions are automatically eliminated, the indicating means IM2 is energized and the actuating coil "Sand-1" is also energized. If desired, of course, individual sanding devices for the various sets of wheels may be provided, and only the sanding device that corresponds to the slipping wheels may be actuated, in the same way that only the indicating means that corresponds to the slipping motor is energized.

Reference may now be had to Fig. 6, wherein the system shown comprises the supply-circuit conductors A, B, and C; the driving induction motors M1 and M2; the liquid rheostats and operating mechanisms LR1 and LR2; the main-circuit switches LS1 to LS6, inclusive; the battery B and the switch SW; as illustrated in Fig. 5, and, in addition, a solenoid-type relay device RD1 that is associated with the secondary windings S1 and S2, in a manner to be described.

The relay device RD1 comprises an actuating coil 160 that is connected through conductors 161 and 162 to two of the terminals of the secondary winding S1; a second actuating coil 163 that is connected through conductors 164 and 165 across one phase of the secondary winding S2; a magnetizable core member 166 that is adapted to be actuated upwardly by the coil 160 and a second alined and mechanically associated core member 167 that is adapted to be actuated downwardly by the coil 163; and a plurality of suitable springs 168 and 169 that are respectively disposed between the core members 166 and 167 and a stationary member 170; whereby the relay device RD1 is biased to an intermediate position wherein a bridging contact member 171 that is associated with the upper end of the relay device occupies an open position, while a pair of contact members 172 and 173 that are associated with the lower end of the relay device assume a closed or operative position.

Assuming that it is desired to effect acceleration of the driving motors, the switch SW may be actuated to its upper position marked Dec., whereupon a circuit is completed from one terminal of the battery B through conductor 174, the blade 175 of the switch SW, stationary contact member 176, conductors 177 and 178, actuating coil 107 of the liquid rheostat LR1, conductor 179, movable contact member 173 of the relay device RD1 and conductors 181 and 182 to the opposite battery terminal. A parallel circuit is established from conductor 177 through conductor 183, the actuating coil 109 of the liquid rheostat LR2, conductor 184, movable contact member 172 of the relay device RD1 and conductor 185 to the negative conductor 181. The resistances of the circuits of the secondary windings S1 and S2 are thus gradually decreased, in the manner already set forth.

To effect the discharge of electrolyte from the tanks 11, the switch SW may be actuated to its position marked Inc., whereupon one circuit is completed from the blade 175 of the switch SW through stationary contact member 186, conductors 187 and 188, actuating coil 108 of the liquid rheostat LR1 and conductor 189 to the negative conductor 182. Another circuit is simultaneously established from the blade 175 of the switch SW through stationary contact member 190, conductors 191 and 192, actuating coil 110 of the liquid rheostat LR2 and conductor 193 to the negative conductor 181, thereby effecting the discharge of the electrolyte from the tanks 11 in the same manner as described in connection with Fig. 5.

Assuming that the rotor S1 and the corresponding wheels "slip," the voltage of the secondary winding S1 decreases, thereby weakening the pull of the actuating coil 160 of the relay device RD1 and thus permitting the actuation of the relay device by the other coil 163 to the lower position, wherein a circuit is established from one terminal of the battery B through conductor 194, bridging contact member 171 of the relay device, and conductor 195 to conductor 188 and the actuating coil 108 of the liquid rheostat 101. The other actuating coil 107 is simultaneously deënergized by the disconnection of the movable contact member 173 of the relay device from conductors 179 and 180. Thus, the resistance of the circuit of the rotor winding S1 is increased until slippage conditions are eliminated.

On the other hand, if the motor M2 and the corresponding wheels "slip," the actuating coil 163 of the relay device is weakened in its effect, whereby the other coil 160 actuates the device to the upper position shown in the drawing, and a circuit is thus completed from the conductor 194 through bridging contact member 171 of the relay device and conductor 196 to conductor 192 and the actuating coil 110 of the liquid rheostat LR2 to increase the resistance of the circuit of the secondary winding S2 until normal-speed conditions are obtained. The upward movement of the relay device effects the disengagement of the contact member 172 and the corresponding contact fingers, whereby the other actuating coil 109 of the liquid rheostat LR2 is deënergized to permit of the desired actuation of the piston 102.

It will thus be seen that I have provided various simple and reliable means for automatically restoring normal conditions in case of the slippage of any driving motor and corresponding set of wheels, and for automatically sanding the rails and indicating to a train operator that a certain motor is "slipping."

I do not wish to be restricted to the specific circuit connections or arrangement and location of parts herein set forth, as various modifications thereof may be effected within the spirit and scope of my invention. I desire, therefore, that only such limitations shall be imposed as are indicated in the appended claims.

I claim as my invention:

1. In an electrically-propelled apparatus, the combination with a plurality of parallel-connected driving motors, of means dependent upon a predetermined abnormal difference of slippage between the motors for automatically and immediately changing conditions to eliminate said difference in the slippage.

2. In an electrically-propelled vehicle, the combination with a plurality of driving wheels and parallel-connected motors associated therewith, of electrical means associated with the several motors and adapted to automatically restore normal conditions upon predetermined abnormal slippage of any wheel.

3. In an electrically-propelled vehicle, the combination with a plurality of driving induction motors suitably associated with the vehicle wheels, of means dependent upon predetermined slippage of any wheels for automatically causing the corresponding motor to eliminate said slippage.

4. In an electrically-propelled vehicle, the combination with a plurality of driving induction motors suitably associated within the vehicle wheels, of means associated with the rotors of said induction motors and dependent upon predetermined slippage of any wheels for automatically changing electrical conditions in the corresponding rotor to eliminate said slippage.

5. In an electrically-propelled vehicle, the combination with a plurality of driving induction motors suitably associated with the vehicle wheels, of means associated with the rotors of said induction motors and dependent upon predetermined slippage of any wheels for automatically increasing the corresponding rotor-circuit resistance to eliminate said slippage.

6. In an electrically-propelled vehicle, the combination with a plurality of driving induction motors suitably associated with the vehicle wheels, of means electrically associated with the rotors of said induction motors and dependent upon the variation of the corresponding rotor frequency upon predetermined slippage of any wheels for increasing said corresponding rotor-circuit resistance to eliminate said slippage.

7. In an electrically-propelled vehicle, the combination with a plurality of driving induction motors suitably associated with the vehicle wheels, of means dependent upon relative variations in the speeds of said motors under wheel-slippage conditions for automatically maintaining substantially equal and normal motor speeds.

8. In an electrically-propelled vehicle, the combination with a plurality of driving induction motors suitably associated with the vehicle wheels, of means associated with the rotors of said induction motors and dependent upon relative variations in the speeds of said rotors under slippage conditions of any wheels for automatically changing electrical conditions in the corresponding rotor to eliminate said slippage.

9. In an electrically-propelled vehicle, the combination with a plurality of driving induction motors suitably associated with the vehicle wheels, of means associated with the rotors of said induction motors and dependent upon relative variations in the speeds of said rotors under slippage conditions of any wheels for automatically increasing the corresponding rotor-circuit resistance to eliminate said slippage.

10. In an electrically-propelled vehicle, the combination with a plurality of driving induction motors suitably associated with the vehicle wheels, of means electrically associated with the rotors of said induction motors and dependent upon relative variations in the frequencies of said rotors under slippage conditions of any wheels for increasing said corresponding rotor-circuit resistance to eliminate said slippage.

11. In an electrically-propelled vehicle, the combination with a plurality of driving induction motors suitably associated with the vehicle wheels, of relay means electrically associated with the rotor of said induction motors, and switching means actuated by said relay means for varying the corresponding rotor-circuit resistance upon the slippage of any wheels to eliminate said slippage.

12. In an electrically-propelled vehicle, the combination with a plurality of driving induction motors suitably associated with the vehicle wheels, of relay means having operating windings associated with the respective rotors of said induction motors, and switching means actuated by said relay means for increasing the corresponding rotor-circuit resistance upon the slippage of any wheels to eliminate said slippage.

13. In an electrically-propelled vehicle, the combination with a plurality of driving induction motors suitably associated with the vehicle wheels, of relay means having operating windings associated with the respective rotors of said induction motors, said operating windings counterbalancing each other under substantially equal-speed conditions of said rotors and being adapted under predetermined unequal rotor-speed conditions to produce an unbalanced effect, and means dependent upon said unbalancing for varying the resistance of one of the rotor circuits.

14. In an electrically-propelled vehicle, the combination with a plurality of driving induction motors suitably associated with the vehicle wheels, of relay means having operating windings associated with the respective rotors of said induction motors, said operating windings counterbalancing each other under substantially equal-speed conditions of said rotors and being adapted under predetermined slippage conditions of any wheels to produce an unbalanced effect, and means dependent upon said unbalancing for increasing the corresponding rotor-circuit resistance to eliminate said slippage.

15. In an electrically-propelled vehicle, the combination with a plurality of driving induction motors suitably associated with the vehicle wheels, of dynamo-electric means electrically associated with the rotors of said induction motors, and switching means actuated by said dynamo-electric means for varying the corresponding rotor-circuit resistance upon the slippage of any wheels to eliminate said slippage.

16. In an electrically-propelled vehicle, the combination with a plurality of driving induction motors suitably associated with the vehicle wheels, of a plurality of auxiliary induction motors having their rotors mechanically associated and having their stators electrically connected with the respective main rotors and rotatively movable within predetermined limits, and means dependent upon the positions of said stators for varying the corresponding main rotor-circuit resistance under predetermined conditions.

17. In an electrically-propelled vehicle, the combination with a plurality of driving induction motors suitably associated with the vehicle wheels, of a plurality of auxiliary induction motors having mechanically associated rotors and having their stators electrically connected with the respective main rotors and respectively rotatively movable within predetermined limits under slippage conditions of the corresponding vehicle wheels and main rotor, and means dependent upon such stator movement for increasing the corresponding main-rotor-circuit resistance to eliminate said slippage.

18. In an electrically-propelled vehicle, the combination with a plurality of driving induction motors suitably associated with the vehicle wheels, of a plurality of auxiliary induction motors having mechanically associated rotors and having their stators electrically connected with the respective main rotors and rotatively movable within predetermined limits, whereby movement of the one or the other auxiliary stator from a normal position occurs only under slippage conditions of the corresponding vehicle wheels and main rotor, a plurality of variable resistors respectively associated with the main rotors, operating mechanisms for varying the respective resistors, and means dependent upon said auxiliary stator movement for effecting the actuation of the one or the other operating mechanism to eliminate said slippage.

19. In an electrically-propelled vehicle, the combination with a plurality of driving induction motors suitably associated with the vehicle wheels, of a plurality of auxiliary induction motors having mechanically associated rotors and having their stators electrically connected with the respective main rotors and rotatively movable within predetermined limits, whereby movement of the one or the other auxiliary stator from a normal position occurs only under slippage conditions of the corresponding vehicle wheels and main rotor, a plurality of variable resistors respectively associated with the main rotors, fluid-pressure-operating mechanisms for varying the respective resistors, electrically-controlled valves for governing the actuation of said mechanisms in the one or the other direction, and switching means dependent upon said auxiliary stator movement for effecting the electrical energization of said valves in such manner as to increase the rotor-circuit resistance of the proper motor to eliminate said slippage.

20. In an electrically-propelled vehicle, the combination with a plurality of driving induction motors suitably associated with the vehicle wheels, of relay means associated with the respective rotors for producing an unbalanced effect under slippage conditions of the corresponding vehicle wheels and main rotor, a plurality of variable resistors respectively associated with the main rotors, fluid-pressure operating mechanisms for varying the respective resistors, electrically-controlled valves for governing the actuation of said mechanisms in the one or the other direction, and switching means dependent upon said unbalanced action for effecting the electrical energization of said valves in such manner as to increase the rotor-circuit resistance of the proper motor to eliminate said slippage.

21. The combination with a plurality of main induction motors, of a relay device actuated in accordance with the relative speeds of said motors and comprising a plurality of auxiliary induction motors connected to the respective main rotors.

22. The combination with a plurality of main induction motors, of a relay device actuated in accordance with the relative speeds of said motors and comprising a plurality of auxiliary induction motors having mechanically associated rotors and severally having stator windings connected to the main rotors.

23. The combination with a plurality of main induction motors, of a relay device actuated in accordance with differences in main rotor frequencies.

24. The combination with two alternating-current systems normally operating with a predetermined frequency ratio therebetween, of means responsive to a departure from said frequency ratio comprising two induction machines having mechanically coupled rotors and having primary windings connected to said systems, respectively, said motors being designed to produce coordinating torques with substantially no energy transfer at said predetermined frequency ratio, and either of said motors being driven hyper-synchronously by the other motor upon a decrease in the relative frequency of the system connected to said driven motor.

25. The combination with two alternating-current systems normally operating at the same frequency, of means responsive to a departure from said frequency equality comprising two induction machines having mechanically coupled rotors and having primary windings connected to said systems, respectively, said motors being designed to produce coordinating torques with substantially no energy transfer with frequency equality in said systems, and either of said motors being driven hyper-synchronously by the other motor upon the frequnecy of the system connected to said driven motor being exceeded by the frequency of the remaining system.

26. The combination with two alternating-current systems normally operating with a predetermined frequency ratio therebetween, of means responsive to a departure from said frequency ratio comprising two induction machines having mechanically coupled rotors and having primary windings connected to said systems, respectively, and stator members arranged to oscillate between stops and to effect circuit control by said movement, said motors being designed to produce coordinating torques with substantially no energy transfer at said predetermined frequency ratio, and either of said motors being driven hyper-synchronously by the other motor upon a decrease in the relative frequency of the system connected to said driven motor to cause the movement of the associated stator from one stop to the other and corresponding circuit control.

27. The combination with two alternating-current systems normally operating at the same frequency, of means responsive to a departure from said frequency equality comprising two induction machines having mechanically coupled rotors and having primary windings connected to said systems, respectively, and stator members arranged to oscillate between stops and to effect circuit control by said movement, said motors being designed to produce coordinating torques with substantially no energy transfer with frequency equality in said systems, and either of said motors being driven hyper-synchronously by the other motor upon the frequency of the system connected to said driven motor being exceeded by the frequency of the remaining system to cause the movement of the associated stator member from one stop to the other and corresponding circuit control.

28. The combination with two alternating-current systems, of a relay device actuated in accordance with the relative frequencies of said systems and comprising a plurality of mechanically coupled auxiliary motors associated therewith.

29. The combination with a plurality of alternating-current systems, of a relay device actuated in accordance with differences in the relative frequencies of said systems.

30. In an electrically-propelled apparatus, the combination with a plurality of parallel-connected driving motors, of means responsive to a relatively great difference of slippage between the motors for automatically and immediately changing conditions only until such difference of slippage is eliminated.

31. In an electrically-propelled vehicle, the combination with a plurality of parallel-connected driving motors suitably associated with the vehicle wheels, of means responsive to predetermined slippage of any wheels for automatically causing the corresponding motor to eliminate said slippage and for maintaining continuous operation of all driving motors.

32. In an electrically-propelled vehicle, the combination with a plurality of driving induction motors suitably associated with the vehicle wheels, of differential means associated with the rotors of said induction motors and responsive to predetermined slippage of any wheels for automatically changing electrical conditions in the corresponding rotor to eliminate said slippage and restore normal conditions in the vehicle.

33. In an electrically-propelled vehicle, the combination with a plurality of driving induction motors suitably associated with the vehicle wheels, of differential relay means associated with the rotors of said induction motors and responsive to relative variations in the speeds of said rotors under slippage conditions of any wheels for automatically increasing the corresponding rotor-circuit resistance only until said slippage is eliminated.

In testimony whereof, I have hereunto subscribed my name this 31st day of Dec. 1915.

RUDOLF E. HELLMUND.